United States Patent [19]

Larkin

[11] 4,052,612
[45] Oct. 4, 1977

[54] ANALOG-TO-DIGITAL ENCODER UNIT EMPLOYING A PRE-ENCODED FILM WITH IMPROVED FILM TENSIONING MEANS

[75] Inventor: Kenneth A. Larkin, Modesto, Calif.

[73] Assignee: E. & J. Gallo Winery, Modesto, Calif.

[21] Appl. No.: 715,071

[22] Filed: Aug. 17, 1976

[51] Int. Cl.² ............................................. H01J 3/14
[52] U.S. Cl. ............................... 250/237 R; 33/126.6; 250/231 R
[58] Field of Search ............. 33/125 A, 125 C, 126.6; 340/347 P, 347 AD; 250/231 R, 237 R, 237 G, 570, 571; 356/169, 170; 73/32

[56] References Cited

U.S. PATENT DOCUMENTS

| 3,558,861 | 1/1971 | Collins et al. | 250/571 |
| 3,658,429 | 4/1972 | Zipin | 33/125 C |
| 3,975,633 | 8/1976 | Larkin | 250/237 R |

*Primary Examiner*—David C. Nelms
*Attorney, Agent, or Firm*—Townsend and Townsend

[57] ABSTRACT

An optical encoder for use with a liquid level measuring device including a pre-encoded film strip bidirectionally translatable between a pair of film reels past a detection station. The film is driven by a sprocket coupled to the spring motor of a perforated tape level gauge, and motion translating means enable the film to be unwound smoothly in either direction. The film has a plurality of digitally encoded tracks which enable an optical detection station to provide information specifying the level of the liquid.

The motion translating means includes first and second hub members rotatably secured to a support member for rotation about the axis of a different one of the film reels, each hub member being provided with a gear portion for mutual driving engagement.

The tension maintaining means includes first and second spring members each coupled between a film reel and a hub member, and received in a central recess of the associated hub member. Each spring member comprises a spiral wound blade spring having inner and outer ends coupled, respectively, to the associated film reel and hub member.

20 Claims, 6 Drawing Figures

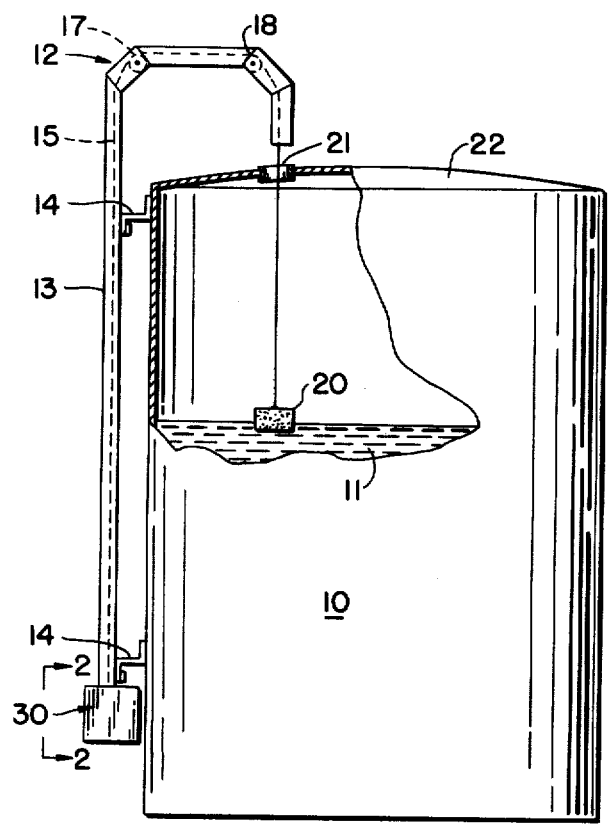
FIG._1.

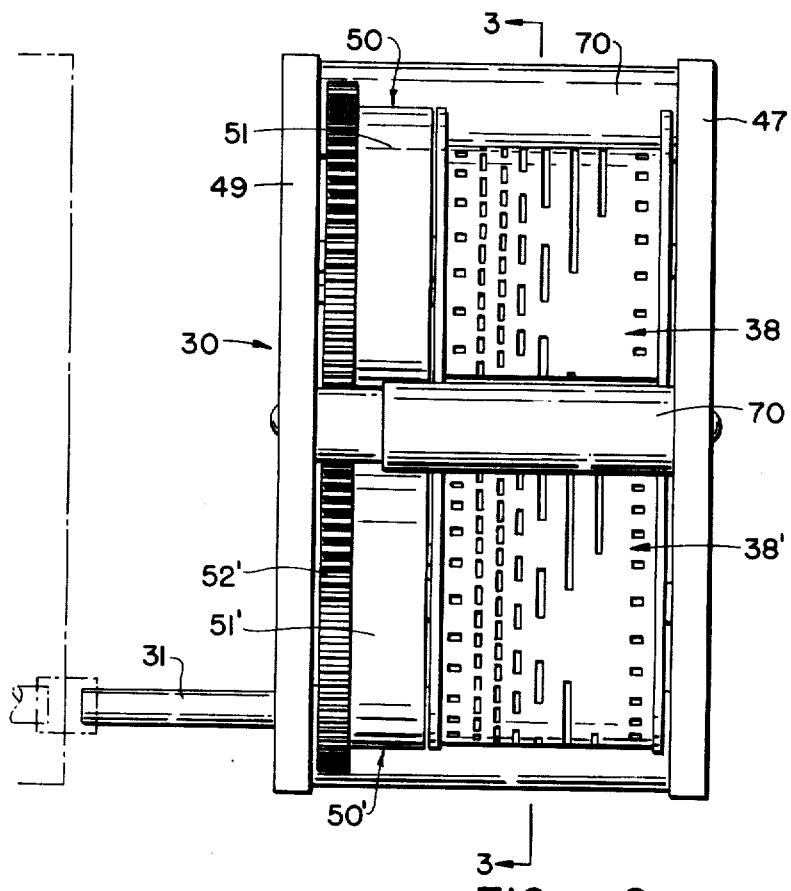
FIG._2.
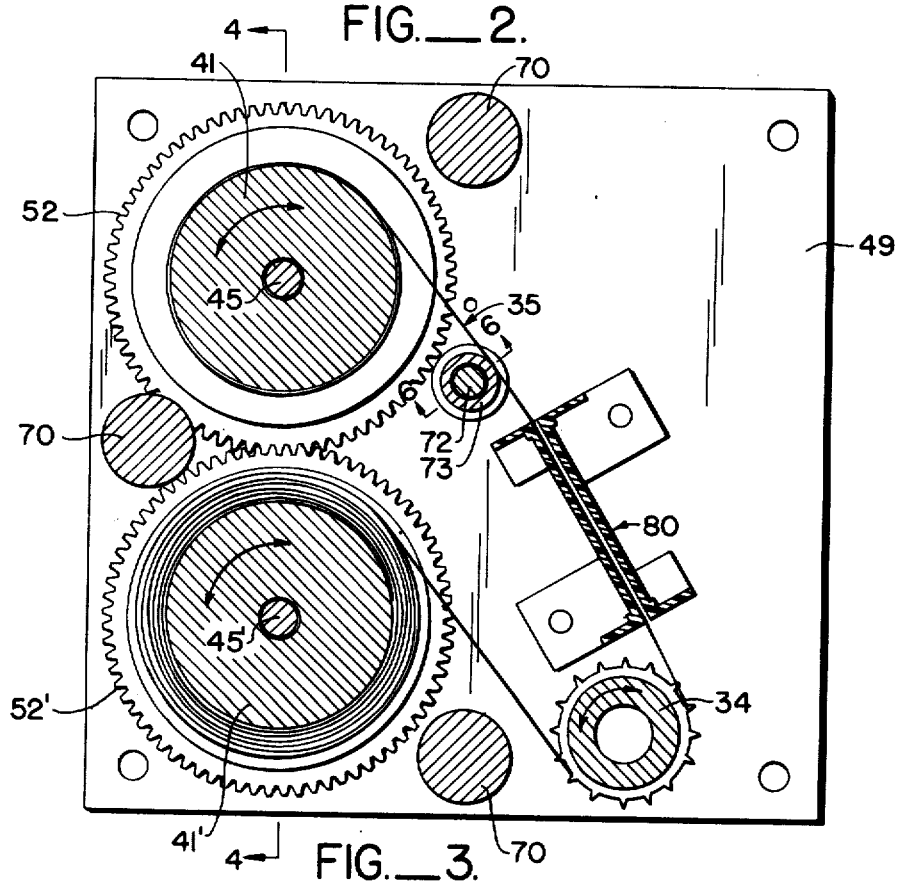
FIG._3.

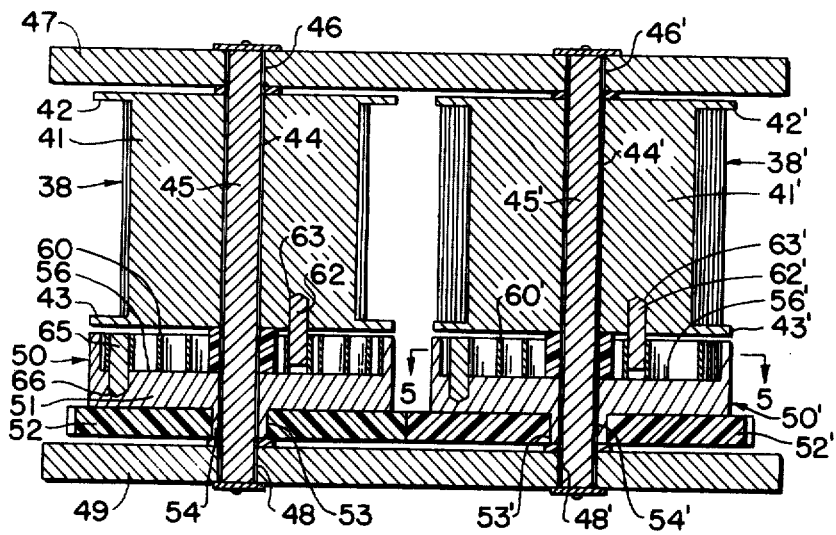
FIG._4.
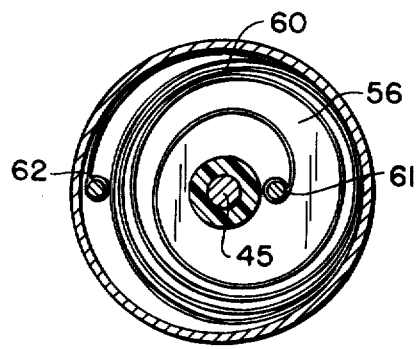
FIG._5.
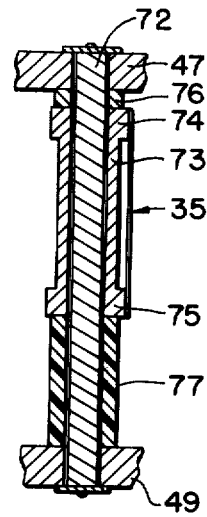
FIG._6.

ANALOG-TO-DIGITAL ENCODER UNIT EMPLOYING A PRE-ENCODED FILM WITH IMPROVED FILM TENSIONING MEANS

BACKGROUND OF THE INVENTION

This invention relates to encoders for converting translational or rotational mechanical movement into electronic position signals. More particularly, this invention relates to analog-to-digital encoders for converting the physical position of a liquid level measuring instrument into digitally encoded electronic position signals.

U.S. patent application Ser. No. 595,185 filed July 11, 1975 for "ANALOG-TO-DIGITAL ENCODER UNIT EMPLOYING A PRE-ENCODED FILM", to be issued as U.S. Pat. No. 3,975,603 on Aug. 17, 1976, the disclosure of which is hereby incorporated by reference, discloses and claims an optical encoder unit for generating digital electrical signals defining the absolute level of a liquid in a tank from the translational position of a perforated tape in a conventional liquid level gauge, which is an improvement over commercially available tank gauge systems. The invention of the referenced patent employs a pre-encoded film strip having a plurality of laterally spaced longitudinally extending tracks with transparent and opaque regions encoded in a predetermined digital code format, which film strip is received on a pair of freely rotatable spools and is guided past an optical detection station by a pair of spaced stationary guide members. A rotatable sprocket having an input shaft adapted to be driven by a shaft coupled to a sprocket in a conventional perforated tape liquid level gauge drives the film strip past the detection station in response to movement of the tape in either direction. A spring-biased pivotally mounted tension arm having a guide in surface contact with the film strip maintains tension therein as the film strip is moved from reel to reel. The spools are mechanically interlinked with a drive belt to provide film take up in either direction.

The optical detection station includes a light source assembly for generating a plurality of laterally spaced light beams and a detector assembly having a corresponding plurality of photosensitive devices each associated to a different one of the light beams and shielded from the remaining beams. The film strip is positioned so that each track occupies the light path between a different one of the beams and photosensitive devices in order to define a plurality of information channels. The electrical position signals output from the photosensitive devices are coupled to a local or remote readout unit provided with electronic circuitry for converting the signal to operator readable digital display values.

While the above-described referenced invention affords several advantages over conventional tank gauge systems, such as non-volatile storage of the liquid level information, local or remote readout, easy installation and removal, and absolute encoding of the liquid level information over a wide range, the specific embodiment disclosed in the above-referenced application is designed for mounting in a particular attitude which is not always convenient to employ. Further, while relatively compact in size, this embodiment is not suitable for use in extremely limited space.

SUMMARY OF THE INVENTION

The invention comprises an improved analog-to-digital encoder unit which affords all of the advantages of the referenced invention noted above, and in addition is much more compact in size and may be mounted for use in any attitude desired without impairing the effectiveness thereof.

In the preferred embodiment, especially adapted for use with existing liquid level measuring devices, a pre-encoded film strip is received about a pair of film reels rotatably mounted on a support member and guided past a detection station by means of guide means secured to the support member adjacent the detection station. The film is driven by a drive sprocket rotatably mounted on the support member and having an input shaft adapted to be driven by a shaft coupled to the spring motor of a perforated tape liquid level gauge so that the film follows the motion of the perforated tape, and motion translating means are provided for transferring motion between the film reels so that the film unwinds smoothly in either translational direction of motion. Also, tension maintaining means provides required tension for the film in the region of the detection station.

The film is encoded with a plurality of laterally spaced longitudinally extending tracks, each track having transparent and opaque portions arranged in a Gray code format, and the detection station includes means for generating a plurality of radiation beams corresponding in number to the number of tracks on the film and a corresponding plurality of radiation sensing devices each associated to a different track for generating bilevel electrical signals representative of the instantaneous position of the film relative to the detection station.

The radiation sensor output signals are coupled to electronic circuitry implementable in solid state form for providing either a local or remote visible readout of the position information. In a local readout embodiment, the electronic circuitry includes an array of amplifiers, a Gray code to binary code decoder, a binary code to BCD code decoder, a plurality of display drivers and a plurality of 7 segment optical character generators. In the remote embodiment, the amplified signals from a sub-plurality of encoder sites are coupled to a central data acquisition station and other remote manual data address points by means of a multiplexer unit which provides parallel to serial conversion of the information.

The motion translating means preferably comprises first and second hub members each rotatably secured to the support member for rotation about the axis of a different one of the first and second film reels, respectively, and each provided with a toothed peripheral portion for mutual driving engagement in an interference region.

The tension maintaining means comprises first and second spring members each coupled between a different one of the first and second film reels and the first and second hub members for providing mechanical intercoupling therebetween. The first and second hub members are preferably each provided with a central recess for receiving a different one of the first and second spring members. The spring members each preferably comprises a spiral wound blade spring having inner and outer ends secured to the associated film reel and hub member, with the inner end of each spring member secured to the associated film reel and the outer end thereof secured to the associated hub member. Each paired film reel and hub member is individually provided with a projecting member to which opposite ends of the associated spring member is attached.

For a fuller understanding of the nature and advantages of the invention, reference should be had to the ensuing detailed description taken in conjunction with the accompanying drawings.

BRIEF DESCRIPTION OF THE DRAWINGS

FIG. 1 is a schematic view partially in section illustrating a tank installation embodying the invention;

FIG. 2 is an enlarged end elevational view of the invention taken along lines 2—2 of FIG. 1;

FIG. 3 is a sectional view taken along lines 3—3 of FIG. 2;

FIG. 4 is a sectional view taken along lines 4—4 of FIG. 2;

FIG. 5 is a sectional view taken along lines 5—5 of FIG. 4; and

FIG. 6 is a sectional view taken along lines 6—6 of FIG. 3.

DESCRIPTION OF THE PREFERRED EMBODIMENT

Turning now to the drawings, FIG. 1 is a schematic end elevational view, partially in section, showing a tank installation employing the invention. As seen in this FIG., a tank 10 containing a liquid 11 is provided with a liquid level measuring apparatus generally designated by reference numeral 12. Liquid level measuring apparatus 12 is a conventional unit and includes a tubular or rectangular hollow conduit 33 secured to the tank side wall and top by means of conventional brackets 14 and enclosing a perforated tape 15 translatably carried by a pair of freely rotatable sheaves 17, 18 mounted in the upper portion thereof. Tape 15 has a plurality of perforations arranged centrally thereof and extending longitudinally therealong (not shown), with a nominal center-to-center spacing of one inch. Attached to the free end of perforated tape 15 is a conventional float 20 which rests on the surface of liquid 11 and rises and falls therewith. The perforated tape 15 passes upwardly through an opening 21 in the top wall 22 of tank 10, over sheaves 18, 17 and downwardly to a conventional spring motor or negator spring assembly (not shown) arranged at the lower end of conduit 13 for maintaining tension on the tape 15.

In use, as the level of the liquid 11 in tank 10 changes, float 20 follows this motion and tape 15 is translated in either direction along conduit 13, depending on whether the level of the liquid 11 is rising or falling. As tape 15 is translated along conduit 13, sheaves 17, 18 and the shaft of the spring motor are rotated in a first direction for a rising liquid level and in the opposite direction for a falling liquid level.

Secured to conduit 13 and tank 10 adjacent the spring motor assembly by means of conventional mounting brackets is an encoder unit generally designated by reference numeral 30 and constructed according to the invention. With reference to FIGS. 2–6, encoder unit 30 has an input shaft 31 coupled by conventional means to the shaft of the spring motor assembly (shown partially in phantom in FIG. 2) and is provided with a sprocket 34, so that translational motion of perforated tape 15 is transmitted to sprocket 34 and converted to rotary motion. Sprocket 34 controls the translation of a pre-encoded film strip 35, described more fully below, which is wound about a pair of rotatable spool assemblies 38,38'.

Spool assembly 38 comprises a unitary drum 41 having a pair of axially spaced integrally formed flange elements 42, 43 defining a film receiving region. Drum 41 is provided with an axial bore 44 in which a spindle 45 is rotatably received so that drum 41 rotates about spindle 45 with low friction. Spindle 45 is rotatably received at a first end in an aperture 46 in housing side plate 47. The remaining end of spindle 45 is similarly secured in an aperture 48 in housing side plate 49.

Mounted for independent rotation coaxially of spindle 45 is a hub member generally designated by reference numeral 50 which includes a generally cylindrical main member 51 and a gear element 52 having a central aperture 53 for receiving a collar portion 54 of main portion 51 in a tight non-slip fit.

As best seen in FIGS. 4 and 5, main portion 51 of hub member 50 is provided with a substantially cylindrical recess 56 opening in the direction of spool assembly 38 and in which a spiral blade spring 60 is received. Received within the inner end 61 of spiral blade spring 60 is a pin 62 fitted within an open bore 63 in drum 41. Similarly, received within outer end 62 of spiral blade spring 60 is a pin 65 secured in a bore 66 in main portion 51 of hub member 50. Thus, motion of spool assembly 38 may be transmitted to hub member 50 by means of pin 62, spring 60 and pin 65.

The structure of pool assembly 38' is substantially identical to that of spool assembly 38 and corresponding elements are identified with primed identical reference numerals. To avoid prolixity, the structure of spool assembly 38 will not be further described.

As best seen in FIGS. 3 and 4, gear portions 52, 52' of hub members 50, 50' are enmeshed in an interference region so that the two hub members rotate in unison.

Side plates 47, 49 are maintained in a rigid spaced attitude by means of spacer members 70. A shaft 72 is rotatably received in side plates 47, 49 for receiving a film guide 73. Film guide 73 comprises a drum shaped member having a pair of spaced flange portions 74, 75, the outer surfaces of which provide support for the edge of film strip 35. As the latter is translated between spool assemblies 38, 38'. Film guide 73 is mounted in a suitable attitude relative to spool assemblies 38, 39' by means of cylindrical spacer elements 76, 77.

A radiation detection station generally designated by reference numeral 80 is secured to side plate 49 by suitable means (not shown) in a position along the path of film 35 adjacent film guide 73. Radiation detection station 80 preferably comprises a commercially available unit manufactured by Hybrid Electronics, Inc. of Chaska, Minnesota under the model designation CNN01-YA 13 channel VFU, and include a light source assembly and an optical detector assembly for providing a plurality of parallel electrical signals representative of a code carried by film 35. Film 35 is described in detail in the above-referenced patent application and accordingly reference may be had to the disclosure thereof for a detailed discussion of this element. Briefly, film 35 is provided with edge perforations to enable translation of the film in response to rotation of sprocket 34, and also a plurality of pre-exposed tracks for providing digitally encoded multi-bit indicia serving to define the relative position of film 35 with respect to detection station 60 to a desired degree of accuracy.

In operation, as perforated tape 15 is translated along conduit 13 by variations in the level of liquid 11 in tank 10, sprocket 34 is rotated in a corresponding sense, causing film 35 to be translated past the detection station 80. As the relative position of film 35 changes, the encoded tracks vary the light sensed by the detector assembly of detection station 80 thereby causing the electrical output signals to change. These signals are then decoded in the manner described in the above-referenced patent application to provide liquid level information signals.

In order to provide accurate light encoding signals from detection station 80, film 35 must be maintained under proper tension along the path of travel between spool assemblies 38,38'. This tension is provided by the arrangement of spool assemblies 38,38', blade springs 60,60' and hub members 50,50'. More particularly, as film 35 is unreeled by rotation of sprocket 34 from a given spool assembly, the spool assembly acting as the supply reel is rotated about its corresponding spindle. This rotation is transmitted via the associated blade spring to the corresponding hub member. Rotation of this hub member is transmitted via the element to the hub member associated with the spool acting as the takeup reel, and through the blade spring associated therewith to that spool assembly. The concerted action of the blade springs 60,60' maintain proper tension in film 35 and also compensates for the varying radial distance between the spindles and the outer periphery of the drum portions 41, 41' as the amount of film on each spool assembly changes.

The invention is ideally suited for applications requiring a digital display at a given tank site, and in applications having a plurality of tanks. Liquid level measuring devices constructed in accordance with the teaching of the invention offer several advantages over known systems. The individual encoder units 30 are compact and rugged, inexpensive to manufacture and fully compatible with existing liquid level gauges, so that they may be readily installed and removed for repair with little or no technical expertise. Further, encoders 30 provide a non-volatile storage of the liquid level information so that this information is not lost in the event of a temporary power failure. Moreover, the invention enables absolute encoding of the level information within a range limited only by the length of the film 35 installed in the encoder 30. In addition, the unit may be quickly and conveniently changed from one system of units, e.g. English, to another, e.g. metric, by simply exchanging encoded films 35. Further, the invention may be adapted to provide local readout at the storage tank site, either continuous or on demand, remote readout at one or more stations, e.g. a supervisor's office, and used for supervisory purposes, e.g. monitoring the transfer of liquids from one tank to another. In addition, the invention is extremely compact in size and therefore is readily adapted for use in applications where space is at a premium, and the invention may also be mounted in any desired attitude without impairing the accurate operation thereof.

It is further noted that, although the invention has been specifically described with reference to use with existing liquid level gauges, the contemplated uses for the invention extend beyond liquid level measurement to the measurement of the position of both translatable and rotatable elements. For example, the invention may be employed to convert the translational position of a machine tool or the angular position of the lead screw of a lathe to digitally encoded signals.

While the above provides a full and complete disclosure of the preferred embodiments of the invention, various modifications, alternate constructions and equivalents may be employed without departing from the true description and scope of the invention. For example, encoder unit 30 need not be mounted alongside the spring motor as shown in FIG. 1, but may be located at substantially any point along the path of perforated tape 15. Therefore the above description and illustrations should not be construed as limiting the scope of the invention which is defined by the appended claims.

What is claimed is:

1. In an optical encoder unit for generating digital electrical signals defining the absolute position of a movable member from a rotatable shaft coupled to said movable member, said optical encoder unit comprising a support member; first and second film reels rotatably secured to said support member; motion translating means for transferring motion between said reels; guide means secured to said support member; a radiation detection station mounted adjacent said guide means, said station including a radiation source for generating a plurality of spaced radiation beams and a radiation detector assembly having a plurality of radiation sensitive means each associated to a different one of said beams for generating said electrical signals; a pre-encoded film strip received by said reels and guided by said guide means past said detection station, said film strip having a plurality of laterally spaced, longitudinally extending coded tracks, each arranged to occupy the radiation path between said source and a different one of said plurality of radiation sensitive means; a non-slip film drive means engageable with said film strip and having an input shaft adapted to be coupled to said rotatable shaft; and means for maintaining tension in said film strip as said strip is translated past said detection station from reel-to-reel in response to rotation of said film drive means; the improvement wherein said motion translating means comprises first and second hub means each rotatably secured to said support member for rotation about the axis of a different one of said first and second film reels, respectively, and each provided with a toothed peripheral portion for mutual driving engagement in an interference region; and wherein said tension maintaining means comprises first and second spring members each coupled between a different one of said first and second film reels and said first and second hub means for providing intercoupling therebetween.

2. The combination of claim 1 wherein said first and second hub means are each provided with a central recess and said first and second spring members are received in said central recess of the associated one of said first and second hub means.

3. The combination of claim 1 wherein said first and second spring members each comprises a spiral wound blade spring having inner and outer ends secured to the associated film reel and hub means.

4. The combination of claim 3 wherein said inner end of each of said spring members is secured to said associated film reel and said outer end of each of said spring members is secured to said associated hub means.

5. The combination of claim 3 wherein said spiral wound blade springs are each wound in the same sense.

6. The combination of claim 1 wherein said radiation source includes a plurality of spaced radiation conducting members and wherein each of said radiation sensitive means is associated to a different one of said radiation conducting members, paired ones of said radiation conducting members and said radiation sensitive means each defining one of a plurality of information channels corresponding to said pre-encoded tracks on said film strip.

7. The combination of claim 1 wherein said film strip is provided with sprocket holes and said drive means comprises a sprocket wheel having a plurality of teeth engagable with said sprocket holes on said film strip.

8. The combination of claim 1 wherein said film strip is encoded in accordance with a first digital encoding format, and wherein said optical encoder unit further includes display means, means for converting the output signals from said radiation detection station to signals having a second digital format, and means responsive to said digital format signals for driving said display means in accordance therewith.

9. The combination of claim 8 wherein said first digital format comprises the Gray code and wherein said second digital format comprises the binary coded decimal code.

10. The combination of claim 1 further including means for transmitting said radiation detection station signals to a remote site.

11. In a system for measuring the level of a liquid in a reservoir, said system having translatable means for following variations in the level of said liquid and means rotated in response to movement of said translatable means, an optical encoder unit for generating digital electrical signals defining the level of said liquid, said optical encoder unit comprising:
a support member;
first and second film reels rotatably secured to said support member;
motion translating means coupled to said reels for transferring motion therebetween;
guide means secured to said support member;
a radiation detection station mounted adjacent said guide means, said station including a radiation source for generating a plurality of spaced radiation beams and a radiation detector assembly having a plurality of radiation sensitive means each associated to a different one of said beams for generating said electrical signals;
a pre-encoded film strip received by said reels and guided by said guide means past said detection station, said film strip having a plurality of laterally spaced, longitudinally extending coded tracks each arranged to occupy the radiation path between said source and a different one of said plurality of radiation sensitive means;
a nonslip film drive means engagable with said film strip and having an input shaft coupled to said rotated means; and
means for maintaining tension in said film strip as said film strip is translated past said detection station from reel to reel in response to rotation of said film drive means;

said motion translating means comprising first and second hub means each rotatably secured to said support member for rotation about the axis of a different one of said first and second film reels, respectively, and each provided with a toothed peripheral portion for mutual driving engagement in an interference region;
said tension maintaining means comprising first and second spring members each coupled between a different one of said first and second film reels and said first and second hub means for providing intercoupling therebetween.

12. The combination of claim 11 wherein said first and second hub means are each provided with a central recess and said first and second spring members are received in said central recess of the associated one of said first and second hub means.

13. The combination of claim 11 wherein said first and second spring members each comprises a spiral wound blade spring having inner and outer ends secured to the associated film reel and hub means.

14. The combination of claim 13 wherein said inner end of each of said spring members is secured to said associated film reel and said outer end of each of said spring members is secured to said associated hub mans.

15. The combination of claim 13 wherein said spiral wound blade springs are each wound in the same sense.

16. The combination of claim 11 wherein said radiation source includes a plurality of spaced radiation conducting members and wherein each of said radiation sensitive means is associated to a different one of said radiation conducting members, paired ones of said radiation conducting members and said radiation sensitive means each defining one of a plurality of information channels corresponding to said pre-encoded tracks on said film strip.

17. The combination of claim 11 wherein said film strip is provided with sprocket holes and said drive means comprises a sprocket wheel having a plurality of teeth engagable with said sprocket holes on said film strip.

18. The combination of claim 11 wherein said film strip is encoded in accordance with a first digital encoding format, and wherein said optical encoder unit further includes display means, means for converting the output signals from said radiation detection station to signals having a second digital format signals for driving said display means in accordance therewith.

19. The combination of claim 18 wherein said first digital format comprises the Gray code and wherein said second digital format comprises the binary coded decimal code.

20. The combination of claim 11 further including means for transmitting said radiation detection station signals to a remote site.

* * * * *